US006506236B2

(12) United States Patent
Golden et al.

(10) Patent No.: US 6,506,236 B2
(45) Date of Patent: Jan. 14, 2003

(54) PROCESS FOR REDUCING THE LEVEL OF CARBON DIOXIDE IN A GASEOUS MIXTURE

(75) Inventors: Timothy Christopher Golden, Allentown, PA (US); Fred William Taylor, Coplay, PA (US); Nasim Hassan Malik, London (GB); Christopher James Raiswell, Crewe (GB); Elizabeth Helen Salter, Cheshire (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/820,051

(22) Filed: Mar. 28, 2001

(65) Prior Publication Data

US 2002/0178914 A1 Dec. 5, 2002

(51) Int. Cl.$^7$ ............................................. B01D 53/04
(52) U.S. Cl. .............................. 95/129; 95/139; 95/902; 62/644
(58) Field of Search ........................... 95/117, 128, 129, 95/139; 62/644; 423/220, 230, 235, 239.2, 328.1, 716, 717, DIG. 21; 502/64, 68, 79

(56) References Cited

U.S. PATENT DOCUMENTS 3,773,690 A * 11/1973 Heinze et al.
3,885,927 A    5/1975 Sherman et al.
4,113,843 A *  9/1978 Mirsky et al.
4,249,915 A    2/1981 Sircar et al.
4,381,255 A    4/1983 Nozemack et al.
4,529,416 A *  7/1985 Sircar et al.
4,541,851 A    9/1985 Bosquain et al.
5,137,548 A    8/1992 Grenier et al.
5,232,474 A    8/1993 Jain
5,531,808 A    7/1996 Ojo et al. ...................... 95/96
5,665,325 A *  9/1997 Verdujn
5,810,910 A    9/1998 Ludwig et al. ................ 95/138
5,868,818 A    2/1999 Ogawa et al. ................. 95/96
5,919,286 A *  7/1999 Golden et al. ................. 95/98
5,962,358 A * 10/1999 Hees et al. ................... 502/67
6,106,593 A *  8/2000 Golden et al. ................ 95/120
6,302,943 B1 * 10/2001 Johnson et al. ................ 95/96
6,409,800 B1 *  6/2002 Ojo et al. ..................... 95/114

* cited by examiner

Primary Examiner—David A. Simmons
Assistant Examiner—Frank M. Lawrence
(74) Attorney, Agent, or Firm—Geoffrey L. Chase

(57) ABSTRACT

A binderless X-type zeolite is used in a process for the reduction of the level of carbon dioxide and/or $N_2O$ in a gaseous mixture, the zeolite being obtained by converting the binder in a bound zeolite to zeolite such that the ratio of the adsorption capacity for carbon dioxide of the binderless zeolite to the adsorption capacity of the bound zeolite is greater than the weight ratio of the level of zeolite in the binderless zeolite to the level in the bound zeolite.

38 Claims, No Drawings

US 6,506,236 B2

PROCESS FOR REDUCING THE LEVEL OF CARBON DIOXIDE IN A GASEOUS MIXTURE

BACKGROUND OF THE INVENTION

This invention relates to a process for reducing the level of carbon dioxide in a gaseous mixture and in particular to the removal of carbon dioxide from a gaseous mixture which is to be subjected to downstream processing in which the presence of carbon dioxide is deleterious. The present invention is especially useful in removing carbon dioxide from air which is to be employed as a feed gas in a process for the cryogenic separation or purification of air.

Carbon dioxide is a relatively high boiling gaseous material and removal of this and other high boiling materials for example water which may be present in a gaseous mixture is necessary where the mixture is to be subsequently treated in a low temperature, for example cryogenic, process. If relatively high boiling materials such as carbon dioxide and water are not removed, they may liquefy or solidify in subsequent processing and lead to pressure drops and flow difficulties in the downstream process. In the purification of air, it may also be necessary or desirable to remove hazardous, for instance explosive materials prior to further processing of the gaseous mixture so as to reduce the risk of build-up in the subsequent process thereby presenting an explosion hazard. Hydrocarbon gases, for example acetylene, may present such a hazard.

Several methods are known for removing carbon dioxide and water from a feed gas by adsorption on to a solid adsorbent including temperature swing adsorption (TSA) and pressure swing adsorption (PSA). In each of these techniques, a bed of adsorbent is exposed to a flow of feed gas for a period to adsorb carbon dioxide and water from the feed gas. Thereafter, the flow of feed gas is shut off from the adsorbent bed and the adsorbent is exposed to a flow of purge gas which strips the adsorbent gas and water from the adsorbent and regenerates it for further use. A pressure swing adsorption or thermal swing adsorption process may suitably be employed in a cryogenic process for the separation of air as a pre-purification step. U.S. Pat. Nos. 4,541,851, 5,137,548 and 5,232,474 describe adsorption processes. In these processes water and carbon dioxide are suitably removed from a gaseous mixture by contacting the mixture with a water adsorbent material for example silica gel or alumina and with a carbon dioxide adsorbent material for example a molecular sieve zeolite. It is conventional to remove water first and then carbon dioxide by passing the gaseous mixture through a single adsorbent layer or separate layers of adsorbent selected for preferential adsorption of water and carbon dioxide in a column. Removal of carbon dioxide and other high boiling components to a very low level is especially desirable for the efficient operation of downstream processes.

In TSA, the heat needed to desorb the carbon dioxide and the water from the adsorbent in the regeneration phase is supplied by heated regenerating gas. In PSA, the pressure of the purge gas is lower than that of the feed gas and the change in pressure is used to remove the carbon dioxide and water from the adsorbent with the heat required for desorption being supplied by the heat of adsorption retained within the bed. Generally, the pressure of the regenerating gas is lower than that of the feed gas in TSA also. However, in a TSA process, the adsorption phase is carried on for a prolonged period and the heat of adsorption of the carbon dioxide and water on the adsorbent liberated during most of the adsorption phase is displaced out of the bed by the flow of gas. It is necessary that the adsorbent bed has a substantial capacity for adsorbing carbon dioxide and water. As disclosed in U.S. Pat. No. 5,137,548, the difference between the temperature of the regenerating gas and the temperature at which adsorption is conducted need not exceed 50° C. and can be substantially less provided that the flow of regeneration gas is sufficient to provide the requisite heat of desorption.

It is known to use zeolites in the selective removal of carbon dioxide from a gaseous mixture both by TSA and PSA, especially prior to a cryogenic air separation process. The use of zeolites 13X and 5A for the selective removal of carbon dioxide is also known, for example as described in U.S. Pat. No. 4,249,915. Zeolites containing a binder are typically produced in the form of a bead or extrudate by mixing small particles of the zeolite together with the binder. Known binders include clays, and also for example alumina, silica and mixtures thereof. The binder is employed so as to improve the mechanical strength of the zeolite particles. Further, a binder provides a wide macropore network in the zeolite particle so one would expect enhanced mass transfer as mass transfer is known to be macropore diffusion controlled.

A zeolite with binder may contain of the order of 20 percent by weight of binder. However, the binder is generally inert and does not contribute to the adsorption capacity of the zeolite. Accordingly, as compared to a binderless zeolite, a given total mass of zeolite with binder has a lower volume or mass of actual zeolite available for adsorption. Put another way, to achieve a given level of adsorption, a higher volume of zeolite with binder is required which requires a larger reactor and hence a consequential increase in capital and variable costs.

U.S. Pat. No. 4,381,255 describes a process for producing a binderless zeolite by extruding a mixture of a zeolite and metakaolin clay and then contacting the extrudate with sodium hydroxide whereby the clay is converted to zeolite. Binderless zeolites have been proposed for use in U.S. Pat. No. 5,810,910 in recovering ozone from gas streams, where they are advantageous because they can contain reduced levels of metal impurities which would catalytically destroy ozone. They have been taught in U.S. Pat. No. 5,868,818 for recovering oxygen from air in a PSA process.

Various attempts have been made to improve upon standard binder containing zeolites for removing carbon dioxide prior to air separation. U.S. Pat. No. 5,531,808 describes a process for the removal of carbon dioxide from gas streams using a type X zeolite which has a silicon to aluminium ratio of not greater than 1.15. By employing a zeolite having these characteristics, this process advantageously reduces or avoids the need to refrigerate the gas stream in an air separation process.

U.S. Pat. No. 3,885,927 describes a process in which carbon dioxide is removed from a gas stream containing carbon dioxide at a level of not more than 1000 ppm using a type X zeolite containing at least 90 percent equivalent barium cations at a temperature of −40° C. to 120° C.

BRIEF SUMMARY OF THE INVENTION

It has now been found that binderless zeolites exhibit higher capacity for adsorption of carbon dioxide than would be expected from a consideration of the adsorption capacity of a zeolite with binder and the expected increase in capacity if the binder were replaced by the same zeolite. Similar results have been obtained in relation to the adsorption of $N_2O$. The enhanced capacity is especially beneficial for use in a TSA process.

DETAILED DESCRIPTION OF THE INVENTION

Accordingly, a first aspect of the invention provides a process for the reduction of the level of carbon dioxide in a gaseous mixture comprising carbon dioxide and at least one other gaseous component which comprises contacting the gaseous mixture and binderless X-type zeolite wherein the binderless zeolite is obtained by producing a zeolite comprising a binder and converting the binder into zeolite so as to reduce the level of binder whereby a first ratio taken between the adsorption capacity for carbon dioxide of the binderless zeolite to the adsorption capacity of the zeolite comprising a binder prior to the reduction of the level of the binder is greater than a second ratio taken between the level of zeolite in the binderless zeolite by weight per cent to the level of zeolite in the zeolite with binder prior to reducing the level of the binder.

In a second aspect, the invention provides a process for the reduction of the level of $N_2O$ in a gaseous mixture comprising $N_2O$ and at least one other gaseous component which comprises contacting the gaseous mixture and binderless X-type zeolite wherein the binderless zeolite is obtained by producing a zeolite comprising a binder and converting the binder into zeolite so as to reduce the level of binder whereby a first ratio taken between the adsorption capacity for $N_2O$ of the binderless zeolite to the adsorption capacity of the zeolite comprising a binder prior to the reduction of the level of the binder is greater than a second ratio taken between the level of zeolite in the binderless zeolite by weight per cent to the level of zeolite in the zeolite with binder prior to reducing the level of the binder.

In accordance with either aspect of the invention, preferably, said first ratio exceeds said second ratio by at least 2.5%, more preferably by at least 10%, and most preferably by at least 20%.

The present invention advantageously provides a means of securing highly efficient removal of carbon dioxide or of $N_2O$ from the gaseous mixture. Surprisingly, the adsorption capacity per unit volume or mass of a binderless zeolite for adsorption of carbon dioxide is greater than that of the zeolite part of the zeolite with binder. The present invention also exhibits the advantage that the binderless zeolite also has enhanced capacity for adsorption of $N_2O$ compared to the zeolite fraction of the zeolite with binder.

Further, the mass transfer for carbon dioxide and for $N_2O$ of the binderless zeolite is surprisingly improved as compared to that of the bound form of the zeolite which runs contrary to expectation and allows a reduction in mass transfer zone length to achieve a given adsorption capacity. The present invention therefore includes the use of a binderless zeolite in carbon dioxide and/or $N_2O$ adsorption to reduce the length of the carbon dioxide and or $N_2O$ mass transfer zone.

Alternatively the improved mass transfer may be utilised to obtain a higher process throughput by increasing the flow of the feed gaseous mixture. In a conventional process, an increase in flow of feed gas may lead to unacceptable fluidisation of the adsorption material.

However, it has been found that, for the same or longer mass transfer zone length as compared to that used in a conventional process, the higher adsorption capacity of binderless zeolite allows a higher flow of feed stock without the need to change the process cycle time. A plant for removing carbon dioxide and water from a feed mixture, for example air, may be upgraded to have an increased throughput by replacing conventional adsorbent with a binderless zeolite without increasing the volume of adsorbent and hence the size of the bed in the plant.

Suitably, the binderless zeolite has a larger particle size than that of a conventional zeolite employed in a conventional process. Suitably, the binderless zeolite has a particle size of at least 1 mm and desirably at least 1.5 mm. The particle size preferably is not more than 4 mm and more preferably not more than 3.5 mm. The binderless zeolite may optimally have a particle size of 2 to 3.5 mm, for example 3.2 mm.

In practice in an air separation plant, the throughput of feed gas may typically be the limiting feature in plant capacity. The present invention ameliorates this limiting step by "de-bottlenecking" the plant at least to some extent. The major practical advantage of allowing increased process throughput may be secured but without causing deleterious fluidisation of the adsorbent.

Further, the surprising advantages secured by the present invention are not obtained at the expense of a disadvantageous reduction in the physical structure of the zeolite. Thus, the binderless zeolite has adequate mechanical strength for use in the adsorption of carbon dioxide or of $N_2O$.

In the present context, the term "removal" means reducing the level of a component in a gaseous mixture to a level below which the mixture may be subjected to a further downstream process without adverse effects due to the reduced presence of the component.

A zeolite may be considered to be "binderless" if the level of residual binder is not more than 5 percent by weight of the adsorbent. Suitably, the level of binder in the zeolite after reduction of the level of binder to produce a binderless zeolite is not greater than 2 percent by weight of the zeolite so as to secure as great as possible adsorption capacity for carbon dioxide for the binderless zeolite.

Preferably the zeolite is of type A or type X for example zeolite F9-HA available from Tosoh Corporation.

Suitably the binderless zeolite has a silicon to aluminium ratio of at least 1.2. Preferably at least 90 percent of the exchangeable cations in the binderless zeolite are sodium and/or calcium.

Provided at least 90 percent of the binderless zeolite exchangeable cations are sodium and/or calcium, the zeolite may also contain other exchangeable cations selected from Group 1A, 11A and 111A of the Periodic Table, lanthanide series ions, zinc 11 ion, chromium 111 Ion, copper 11 ion, Iron 111 ion, the ammonium ion or the hydronium ion. Ions which are preferred in addition to calcium and sodium are lithium, magnesium, aluminium, cerium, lanthanum, praseodymium and neodymium ions.

The binderless zeolite is suitably in particulate form and the particles may be any shape but are preferably generally spherical. The size of the particles is preferably 0.5 to 3 mm.

In a preferred embodiment, the mass transfer zone of the binderless zeolite is at least 10 percent and preferably at least 20 percent shorter than that of the zeolite with binder from which the binderless zeolite is formed.

Suitable gaseous mixtures containing carbon dioxide or $N_2O$ which is to be reduced in level to which the invention may be applied include air, natural gas, a hydrocarbon gas or a mixture of such gases and synthetic gas and gaseous mixtures comprising carbon dioxide and or $N_2O$ and at least one of nitrogen, oxygen, carbon monoxide, methane, hydrogen or an inert gas, for example argon and helium. In a preferred embodiment, the gaseous mixture is air and the mixture in which carbon dioxide and/or $N_2O$ has been reduced is suitably subjected to a downstream process of cryogenic separation especially for the recovery of oxygen and/or nitrogen.

Where water is present in the gaseous mixture, the mixture is suitably treated by contacting with a desiccant so as to remove the water. Desirably, water is removed prior to the adsorption step for the removal of carbon dioxide and/or $N_2O$. Suitable desiccants include, alumina, silica gel, impregnated alumina, and type A and type X zeolites.

Carbon dioxide may be present in the gaseous mixture at any level but the invention is of especial applicability where the level of carbon dioxide is less than 1000 ppm and especially below 400 ppm.

The process of $CO_2$ and/or $N_2O$ removal may be operated using a single bed or adsorbent but preferably is operated using at least two parallel beds so as to allow the process to be operated in a cyclic manner comprising adsorption and desorption with the beds being cycled out of phase to provide a pseudo-continuous flow of gas from the process.

The gaseous mixture is suitably fed to the adsorption step at a temperature of −50 to 80° C. and preferably 0 to 50° C., especially 10 to 40° C. Suitably the pressure of the gaseous mixture is 1 and preferably 2 to 30 bar absolute (bara) more preferably 2 to 15 bara. The regeneration is carried out at a temperature above the bed adsorption temperature, suitably at a temperature of 80 to 400° C. Suitably, the regeneration pressure is 0.1 to 30 bara and preferably 0.5 to 10 bara. It is especially desirable that the regeneration pressure does not exceed 50 percent of the pressure of the feed gas.

In a cyclical process, the gaseous mixture is introduced into an adsorption zone and contacted with the binderless zeolite, suitably in the form of a bed, optionally with a preceding step in which the mixture is contacted with a desiccant. As the mixture passes through the binderless zeolite, carbon dioxide and/or $N_2O$ is adsorbed and the remaining gas then passes out of the adsorption zone. During the process a front of carbon dioxide or of $N_2O$ forms in the zeolite and passes through it. As desired, the adsorption step is then terminated and the adsorption zone is then heated and optionally subjected to a reduced pressure and the adsorption zone is purged during regeneration. Preferably, the purge gas comprises a gas recycled from a downstream process, for example a nitrogen-rich waste gas stream from an air separation plant.

Preferably, the process is operated with a molar flow of regenerating gas to the gaseous mixture feed gas of 0.1 to 0.8 more preferably 0.2 to 0.5.

Suitably, the gaseous mixture is fed to the adsorption zone for a period of 60 to 600 minutes and preferably 70 to 300 minutes.

The adsorption step is suitably operated in a conventional manner known to those skilled in the art.

In a preferred embodiment, the invention provides a process for the reduction of the level of carbon dioxide and water in the air, passing the air depleted in water to an adsorption zone and contacting the water-depleted air with binderless X-type zeolite so as to remove carbon dioxide from the water-depleted air and passing the air depleted in water and carbon dioxide to a cryogenic separation process in which at least one of the components of the air depleted in carbon dioxide and water is recovered wherein the binderless zeolite has a silicon to aluminium ratio of at least 1.2 and at least 90 percent of its exchangeable cations are sodium and/or calcium wherein the binderless zeolite is obtained by producing a zeolite comprising a binder and converting the binder into zeolite so as to reduce the level of binder whereby the ratio of the adsorption capacity for carbon dioxide of the binderless zeolite to the adsorption capacity of the zeolite comprising a binder prior to the reduction of the level of the binder is greater than ratio of the level of zeolite in the binderless zeolite by weight percent to the level of zeolite in the zeolite with binder prior to reducing the level of the binder.

Preferably, the zeolite is 13X.

Preferably, the desiccant and binderless zeolite are arranged in a composite bed with the zeolite downstream of the desiccant although separate beds may be employed if desired.

The invention is illustrated by the following non-limiting examples.

EXAMPLE 1

A feed gas of air with 400 ppm $CO_2$ and a flow rate of 30 lbmoles/ft$^2$/hr (146 kg moles/m$^2$/h) was passed through a binderless 13X zeolite (zeolite F9-HA available from Tosoh Corporation) at 25° C., 100 psig (6.89×10$^5$ N/m$^2$ gauge). This process was repeated with a bound (18 percent binder) 13X zeolite 13X, the precursor from which the binderless 13X zeolite was made. Both samples had an average particle diameter of 1.7 mm. The data were obtained in a 1 inch diameter column by 6 feet long. Prior to the experiments, the zeolite was regenerated by contact with flowing $N_2$ at 200° C. The results clearly show that the binderless material has a shorter mass transfer zone.

Table 1 shows the $CO_2$ mass transfer zones obtained with both bound (18 weight percent binder) and binderless 13X zeolite at 25°, 100 psig (6.89×10$^5$ N/m$^2$ gauge).

TABLE 1

| Adsorbent | $CO_2$ mass transfer zone (inches) |
| --- | --- |
| 13X with 18 wt % binder | 7.8 (198 mm) |
| Binderless 13X | 4.9 (124 mm) |

EXAMPLE 2

It has also been determined that the $CO_2$ capacity of the binderless 13X is surprisingly higher than that of 13X containing binder. The $CO_2$ capacity of the bound (18 weight percent binder) and binderless 13X of Example 1 was determined by break-through measurement. The column used was 8 inches (203mm) in diameter by 6 feet (1.83m) long and the feed conditions were 27° C., 87 psig (6.00×10$^5$ N/m$^2$ gauge), with a feed gas of air with 370 ppm $CO_2$ and a flow rate of 39 lbmoles/ft$^2$/hr (190 kg moles/m$^2$/h). Both samples had an average particle diameter of 1.7 mm. Prior to the experiments, the zeolite was regenerated in flowing $N_2$ at 200° C. Table 2 shows the results of that testing.

TABLE 2

| Absorbent | Relative adsorbent $CO_2$ capacity (mmole/g total) | Relative zeolite $CO_2$ capacity (mmole/g zeolite) |
|---|---|---|
| 13X with 18 wt % binder | 1.0 | 1.0/0.82 = 1.22 |
| Binderless 13X | 1.55 | 1.55 |

These results show that even when the capacity of bound zeolite is compensated for the presence of binder (final column in Table 2), the binderless material unexpectedly still has a very substantially higher $CO_2$ capacity that the as-synthesised 13X. The said first ratio (1.55:1) in this case exceeds the said second ratio (1.22:1) by (1.55–1.22).100/1.22%, i.e. 27%.

EXAMPLE 3

It has also been determined that binderless CaX has the same type of unique properties as binderless NaX. Single column breakthrough experiments as described in Example 1 were carried out with samples of bound (12 wt %) and binderless CaX. The results of this testing is given in Table 3.

TABLE 3

| Absorbent | MTZ (inches) | Relative $CO_2$ adsorbent capacity (mmole/g total) | Relative $CO_2$ zeolite capacity (mmole/g zeolite) |
|---|---|---|---|
| CaX with 12 wt % binder | 13.6 (345 mm) | 1.0 | 1/0.88 = 1.14 |
| Binderless CaX | 9.6 (244 mm) | 1.17 | 1.17 |

The results in Table 3 show that binderless CaX has improved mass transfer over bound CaX as well as higher capacity, even when the presence of binder is taken into consideration. Here said first ratio exceeds said second ratio by 2.6%.

EXAMPLE 4

It has also been determined that binderless NaX has improved $N_2O$ capacity over bound 13X even when the presence of binder is accounted for. $N_2O$ is a trace air impurity that can concentrate in the liquid oxygen portion of the cryogenic column and freeze out causing operational or safety problems with the plant. The $N_2O$ adsorption isotherm on NaX with binder (18 wt %) and without binder was measured at 30° C. The results of the isotherm measurements are shown in Table 4.

TABLE 4

| Absorbent | Relative adsorbent $N_2O$ Henry's constant (mmole/g total/atm) | Relative zeolite $N_2O$ Henry's constant (mmole/g zeolite/atm) |
|---|---|---|
| 13X with 18 wt % binder | 1.0 | 1.0/0.82 = 1.22 |
| Binderless 13X | 1.52 | 1.52 |

The results in Table 4 show that the $N_2O$ capacity of binderless 13X is greater than that of the bound material even when the amount of inert binder is accounted for, as noted in the case of $CO_2$ as well. Here said first ratio exceeds said second ratio by 24.6%. Again, this result is quite unexpected. The improved $N_2O$ capacity will make the binderless material better for $N_2O$ removal from air.

Many modifications and variations of the invention as described with reference to preferred embodiments are possible within the overall scope of the invention.

EXAMPLE 5

Experiments to assess $CO_2$ breakthrough were conducted in the same apparatus and at the same inlet feed conditions as shown in Example 2. Binderless zeolite 13X of the type employed in Example 2 but having a particle diameter of 3.2 mm was used in this experiment. The results are set out in Table 5.

TABLE 5

| Adsorbent | Particle diameter (mm) | Mass Transfer Zone (mm) | Relative time to $CO_2$ breakthrough |
|---|---|---|---|
| 13X with 18% binder | 1.7 | 132 | 1.0 |
| Binderless 13X | 3.2 | 224 | 1.13 |

The advantage of using adsorbent particles having a larger diameter in fixed bed adsorbers is that a lower pressure drop is experienced in the adsorber. At lower pressure drops, a comparatively higher feed flow rates (and hence higher plant productivity) may be attained before disadvantageous fluidization of the adsorbent bed occurs which may cause formation of dust and attrition.

However larger adsorbent particles require a longer mass transfer zone lengths for impurity removal. The results in Table 3 show that large diameter binderless 13X adsorbent may be employed and surprisingly increase the time to $CO_2$ breakthrough (see Table 3) as compared to employing a bound 13X zeolite having a smaller particle size.

A practical advantage of this surprising result is that large particle diameter binderless 13X may be employed in adsorbers designed for bound 13X having a smaller particle size to increase feed and hence product flow rates. Despite a larger mass transfer zone length owing to increased particle diameter, the large particle binderless 13X has comparatively an increased on-line time and lower bed pressure drop.

What is claimed is:

1. A process for the reduction of the level of carbon dioxide in a gaseous mixture comprising carbon dioxide and at least one other gaseous component which comprises contacting the gaseous mixture and a binderless X-type zeolite wherein the binderless X-type zeolite is obtained by producing a X-type zeolite comprising a binder and converting the binder into the binderless X-type zeolite so as to reduce the level of the binder therein whereby a first ratio taken between the adsorption capacity for carbon dioxide of the binderless X-type zeolite to the adsorption capacity of the X-type zeolite comprising the binder prior to the reduction of the level of the binder is greater than a second ratio taken between the level of the zeolite in the binderless X-type zeolite by weight per cent to the level of zeolite in the X-type zeolite with the binder prior to reducing the level of the binder.

2. A process as claimed in claim 1, wherein said first ratio is greater than said second ratio by at least 2.5%.

3. A process as claimed in claim 2, wherein said first ratio is greater than said second ratio by at least 10%.

4. A process as claimed in claim 2, wherein said first ratio is greater than said second ratio by at least 20%.

5. A process as claimed in claim 1, wherein the level of binder in the zeolite after reduction of the level of binder to produce a binderless zeolite is not greater than 2 percent by weight of the zeolite.

6. A process as claimed in claim 5, wherein the mass transfer zone for carbon dioxide of the binderless zeolite is at least 10 percent shorter than that of the zeolite with binder from which the binderless zeolite is formed.

7. A process as claimed in claim 6, wherein the mass transfer zone for carbon dioxide of the binderless zeolite is at least 20 percent shorter than that of the zeolite with binder from which the binderless zeolite is formed.

8. A process as claimed in claim 1, wherein said gaseous mixture is air.

9. A process as claimed in claim 1, wherein said zeolite is a 13X zeolite.

10. A process as claimed in claim 1 wherein said binderless zeolite has a particle size of 1 to 4 mm.

11. A process as claimed in claim 10 wherein said binderless zeolite has a particle size of 2 to 3.5 mm.

12. A process as claimed in claim 1 wherein said binderless zeolite has a silicon to aluminium ratio of at least 1.2.

13. A process as claimed in claim 1 wherein at least 90% of the exchangeable cations of the said binderless zeolite are sodium and/or calcium.

14. A process for the reduction of the level of carbon dioxide and water in air comprising contacting the air with a desiccant so as to remove water therefrom, and passing the air depleted in water to an adsorption zone and contacting the water-depleted air with a binderless X-type zeolite so as to remove carbon dioxide from the water-depleted air and passing the air depleted in water and carbon dioxide to a cryogenic separation process in which at least one of the components of the air depleted in carbon dioxide and water is recovered, wherein the binderless X-type zeolite is obtained by producing a X-type zeolite comprising a binder and converting the binder into the binderless X-type zeolite so as to reduce the level of the binder therein whereby a first ratio taken between the adsorption capacity for carbon dioxide of the binderless X-type zeolite to the adsorption capacity of the X-type zeolite comprising the binder prior to the reduction of the level of the binder is greater than a second ratio taken between the level of the zeolite in the binderless X-type zeolite by weight per cent to the level of zeolite in the X-type zeolite with the binder prior to reducing the level of the binder.

15. A process as claimed in claim 14, wherein said first ratio is greater than said second ratio by at least 2.5%.

16. A process as claimed in claim 15, wherein said first ratio is greater than said second ratio by at least 10%.

17. A process as claimed in claim 15, wherein said first ratio is greater than said second ratio by at least 20%.

18. A process as claimed in claim 14, wherein the level of binder in the zeolite after reduction of the level of binder to produce a binderless zeolite is not greater than 2 percent by weight of the zeolite.

19. A process as claimed in claim 18, wherein the mass transfer zone for carbon dioxide of the binderless zeolite is at least 10 percent shorter than that of the zeolite with binder from which the binderless zeolite is formed.

20. A process as claimed in claim 19, wherein the mass transfer zone for carbon dioxide of the binderless zeolite is at least 20 percent shorter than that of the zeolite with binder from which the binderless zeolite is formed.

21. A process as claimed in claim 14, wherein said zeolite is a 13X zeolite.

22. A process as claimed in claim 14 wherein said binderless zeolite has a particle size of 1 to 4 mm.

23. A process as claimed in claim 22 wherein said binderless zeolite has a particle size of 2 to 3.5 mm.

24. A process as claimed in claim 14 wherein said binderless zeolite has a silicon to aluminium ratio of at least 1.2.

25. A process as claimed in claim 14 wherein at least 90% of the exchangeable cations of the said binderless zeolite are sodium and/or calcium.

26. A process for the reduction of the level of $N_2O$ in a gaseous mixture comprising $N_2O$ and at least one other gaseous component which comprises contacting the gaseous mixture and a binderless X-type zeolite wherein the binderless X-type zeolite is obtained by producing a X-type zeolite comprising a binder and converting the binder into the binderless X-type zeolite so as to reduce the level of the binder therein whereby a first ratio taken between the adsorption capacity for $N_2O$ of the binderless X-type zeolite to the adsorption capacity of the X-type zeolite comprising the binder prior to the reduction of the level of the binder is greater than a second ratio taken between the level of the zeolite in the binderless X-type zeolite by weight per cent to the level of zeolite in the X-type zeolite with the binder prior to reducing the level of the binder.

27. A process as claimed in claim 26, wherein said first ratio is greater than said second ratio by at least 2.5%.

28. A process as claimed in claim 27, wherein said first ratio is greater than said second ratio by at least 10%.

29. A process as claimed in claim 27, wherein said first ratio is greater than said second ratio by at least 20%.

30. A process as claimed in claim 26, wherein the level of binder in the zeolite after reduction of the level of binder to produce a binderless zeolite is not greater than 2 percent by weight of the zeolite.

31. A process as claimed in claim 30, wherein the mass transfer zone for $N_2O$ of the binderless zeolite is at least 10 percent shorter than that of the zeolite with binder from which the binderless zeolite is formed.

32. A process as claimed in claim 31, wherein the mass transfer zone for $N_2O$ of the binderless zeolite is at least 20 percent shorter than that of the zeolite with binder from which the binderless zeolite is formed.

33. A process as claimed in claim 26, wherein said gaseous mixture is air.

34. A process as claimed in claim 26, wherein said zeolite is a 13X zeolite.

35. A process as claimed in claim 26 wherein said binderless zeolite has a particle size of 1 to 4 mm.

36. A process as claimed in claim 35 wherein said binderless zeolite has a particle size of 2 to 3.5 mm.

37. A process as claimed in claim 26 wherein said binderless zeolite has a silicon to aluminium ratio of at least 1.2.

38. A process as claimed in claim 26 wherein at least 90% of the exchangeable cations of the said binderless zeolite are sodium and/or calcium.

* * * * *